tudinally split neck provided with grooves for receiving the splines of the neck bore, which is arranged to be inserted into the bore of the stem, the neck being provided with a frustro-conical bore expanding toward the free end of the neck, a reversely tapered bolt engaging said frustro-conical bore and having its threaded end extending through a hole in the head portion, and the bore of the stem and the periphery of the neck being provided with interengaging portions to prevent relative rotation.

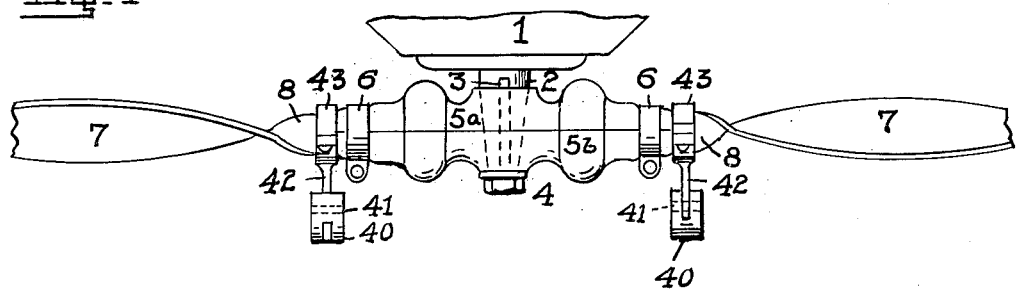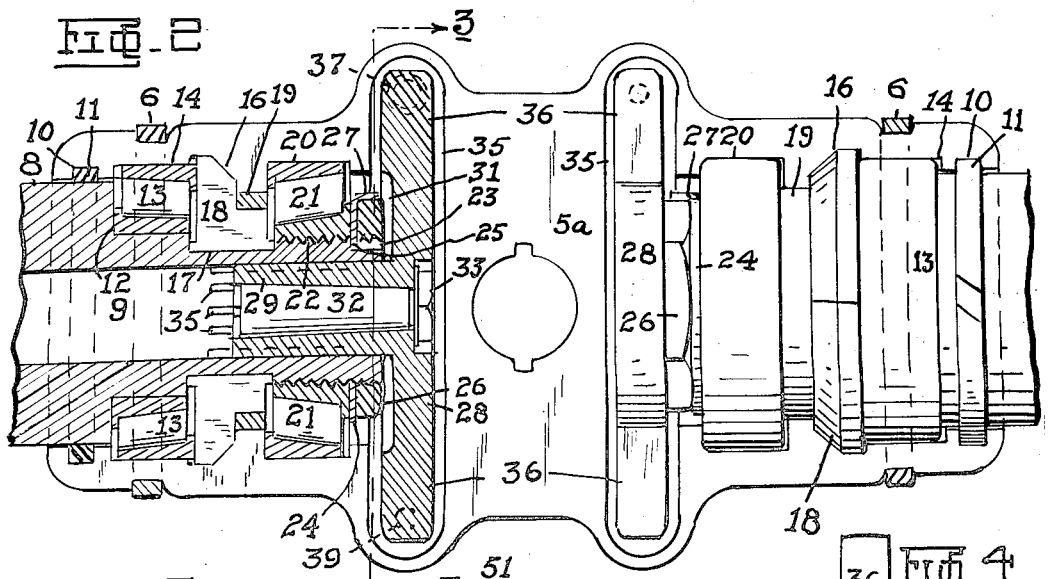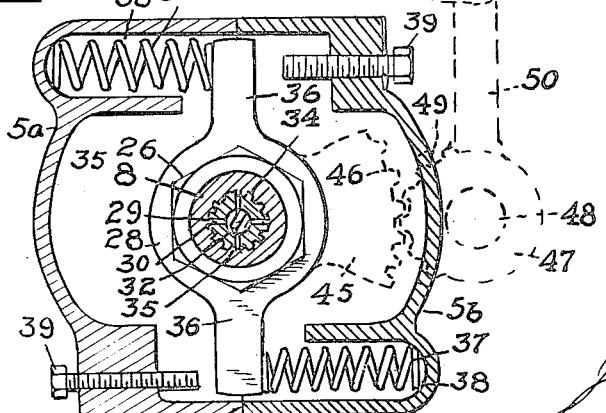

3. In a variable pitch propeller mechanism, a hub member having a chamber of substantially rectangular contour extending transversely of the hub member, said hub member extending outwardly beyond said chamber and having a bearing bore in the outwardly extending portion, a blade stem in said bearing bore, a head secured to the inner end of said stem and located in said chamber, a pair of arms radiating from said stem in diametrically opposite directions, springs between opposite side walls of said chamber and said arms and urging said head to rotate in one direction with respect to said chamber, and abutments extending from said opposite side walls in alinement with said springs and on the sides of the arms opposite the sides engaged by said springs.

4. In a variable pitch propeller mechanism, a hub member having a chamber of substantially rectangular contour extending transversely of the hub member, said hub member extending outwardly beyond said chamber and having a bearing bore in the outwardly extending portion, a blade stem in said bearing bore, a head secured to the inner end of said stem and located in said chamber, a pair of arms radiating from said stem in diametrically opposite directions, springs between opposite side walls, of said chamber and said arms and urging said head to rotate in one direction with respect to said chamber, and bolts screwed through said side walls to form adjustable abutments extending from said opposite side walls in alinement with said springs and on the sides of the arms opposite the sides engaged by said springs.

5. In a variable pitch propeller mechanism, a hub member having a chamber of substantially rectangular contour extending transversely of the hub member, said hub member extending outwardly beyond said chamber and having a bearing bore in the outwardly extending portion, a blade stem in said bearing bore, a head secured to the inner end of said stem and located in said chamber, a pair of arms radiating from said stem in diametrically opposite directions, springs between opposite side walls of said chamber and said arms and urging said head to rotate in one direction with respect to said chamber, abutments extending from said opposite side walls in alinement with said springs and on the sides of the arms opposite the sides engaged by said springs, and other abutments extending from said side walls alongside of said springs to limit compression of the springs.

6. In a variable pitch propeller mechanism, a hub member having a chamber of substantially rectangular contour extending transversely of the hub member, said hub member extending outwardly beyond said chamber and having a bearing bore in the outwardly extending portion, a blade stem in said bearing bore, a head secured to the inner end of said stem and located in said chamber, a pair of arms radiating from said stem in diametrically opposite directions, springs between opposite side walls of said chamber and said arms and urging said head to rotate in one direction with respect to said chamber, bolts screwed through said side walls to form adjustable abutments extending from said opposite side walls in alinement with said springs and on the sides of the arms opposite the sides engaged by said springs, and other abutments extending from said side walls alongside of said springs to limit compression of the springs.

JOHN RAPP ZIPAY.

Oct. 16, 1934.  F. B. ADAM  1,977,032
PANELBOARD
Filed Feb. 24, 1931
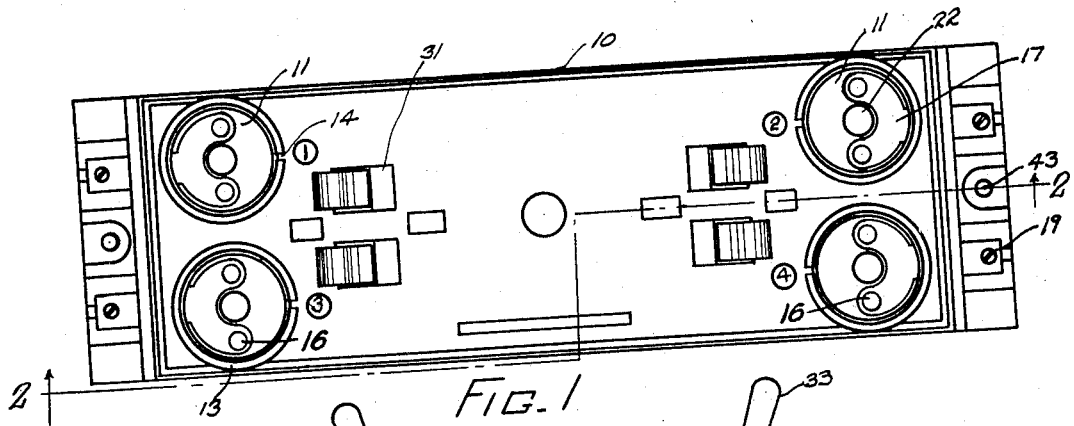
FIG. 1
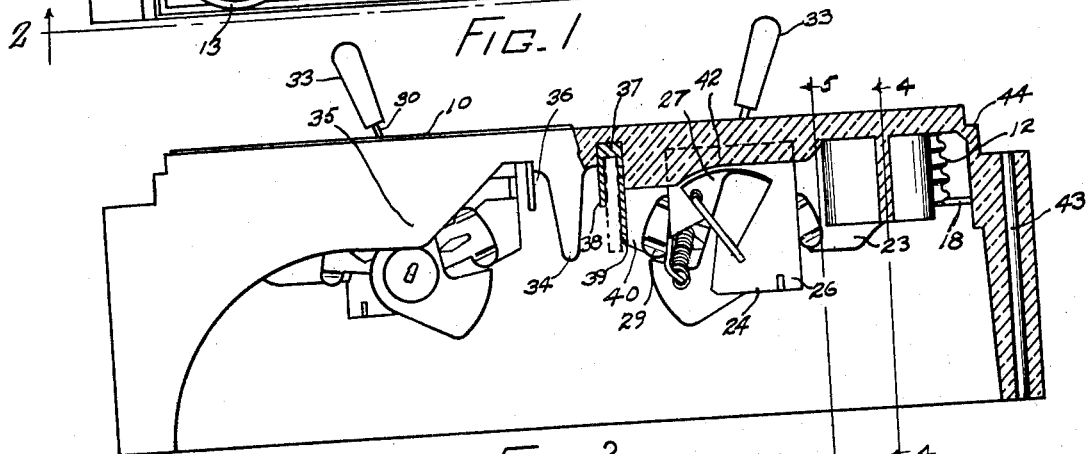
FIG. 2
FIG. 4
FIG. 3
FIG. 5
FIG. 6
INVENTOR
FREDERICK B. ADAM
BY
Eilers & Schaumberg,
ATTORNEYS